US012240280B2

United States Patent
McWhite

(10) Patent No.: US 12,240,280 B2
(45) Date of Patent: Mar. 4, 2025

(54) TOWING ASSEMBLY AND TOWING SYSTEM THEREFOR

(71) Applicant: Roderick Myrl McWhite, North Augusta, SC (US)

(72) Inventor: Roderick Myrl McWhite, North Augusta, SC (US)

(*) Notice: Subject to any disclaimer, the term of this patent is extended or adjusted under 35 U.S.C. 154(b) by 0 days.

(21) Appl. No.: 18/115,190

(22) Filed: Feb. 28, 2023

(65) Prior Publication Data

US 2023/0202249 A1   Jun. 29, 2023

Related U.S. Application Data

(63) Continuation of application No. 17/076,363, filed on Oct. 21, 2020, now Pat. No. 11,618,290.

(51) Int. Cl.
  *B60D 1/46*   (2006.01)
  *B60D 1/06*   (2006.01)

(52) U.S. Cl.
  CPC ............... *B60D 1/465* (2013.01); *B60D 1/06* (2013.01)

(58) Field of Classification Search
  CPC .................................. B60D 1/06; B60D 1/465
  USPC ....................................................... 280/456.1
  See application file for complete search history.

(56) References Cited

U.S. PATENT DOCUMENTS

| 3,785,680 | A | 1/1974 | Good et al. |
| 11,554,942 | B1* | 1/2023 | Wiseman ................. B66D 1/00 |
| 11,618,290 | B2 | 4/2023 | McWhite |
| 2003/0147732 | A1* | 8/2003 | Bellis, Jr. ................ B60P 3/122 414/495 |
| 2015/0016930 | A1 | 1/2015 | Barnett |
| 2022/0118805 | A1 | 4/2022 | McWhite |

OTHER PUBLICATIONS

McWhite, Roderick Myrl; Non-Final Office Action for U.S. Appl. No. 17/076,363, filed Oct. 21, 2020, mailed Jul. 18, 2022, 13 pgs. Document not provided as part of USPTO records.
McWhite, Roderick Myrl; Notice of Allowance for U.S. Appl. No. 17/076,363, filed Oct. 21, 2020, mailed Nov. 29, 2022, 8 pgs. Document not provided as part of USPTO records.

* cited by examiner

*Primary Examiner* — Kevin Hurley
*Assistant Examiner* — Felicia L. Brittman-Alabi
(74) *Attorney, Agent, or Firm* — Taylor English Duma LLP

(57) ABSTRACT

A towing system includes a first lifting mechanism comprising a winch, the winch comprising a drum, a strap, and a drive mechanism, the winch configured to connect a first end of a towable object to a driven vehicle, the first lifting mechanism configurable in a first operable configuration, and wherein the drive mechanism rotates the drum and the strap is increasingly spooled around the drum to elevate the first end of the towable object in the first operable configuration; and a second lifting mechanism configurable in a second operable configuration, the second lifting mechanism configured to connect to a second end of the towable object and to elevate the second end relative to a ground surface in the second operable configuration.

10 Claims, 13 Drawing Sheets

TOWING ASSEMBLY AND TOWING SYSTEM THEREFOR

CROSS-REFERENCE TO RELATED APPLICATIONS

The present application is a continuation of U.S. application Ser. No. 17/076,363, filed Oct. 21, 2020, which issued as U.S. Pat. No. 11,618,290 on Apr. 4, 2023 and is hereby specifically incorporated by reference herein in its entirety.

TECHNICAL FIELD

This disclosure relates to towing systems. More specifically, this disclosure relates to a towing system having front and rear lifting mechanisms.

BACKGROUND

Towing devices are used to tow vehicles or other objects from one location to another. Often, trailers are used for towing vehicles. Typically, a trailer comprises a mount for supporting the vehicle to be towed above a ground surface and one or more wheels configured to roll along the ground surface. However, trailers are typically quite cumbersome in both weight and size. Front lifting mechanisms can also be used for driven vehicles. Front lifting mechanisms may weigh less and be smaller than trailers; however, front lifting mechanisms only elevate the front wheels of the vehicle off the ground surface. The rear wheels of the vehicle remain in contact with the ground surface, and thus experience wear and tear as the vehicle is towed. Still other towing devices do not elevate any of the vehicle's wheels above the ground surface, and thus all of the wheels can experience wear and tear during towing.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is towing system comprising a front lifting mechanism comprising a mounting bracket, a trailer tongue, and a lift connector coupling the trailer tongue to the mounting bracket, the lift connector movable relative to the mounting bracket between a raised orientation and a lowered orientation, the trailer tongue configured to connect a towed vehicle to a driven vehicle; and a rear lifting mechanism comprising a rear lift frame, a rear axle coupled to the rear lift frame, and a rear tow wheel rotatably coupled to the rear axle.

Also disclosed is a towed vehicle assembly comprising a towed vehicle defining a front end and a rear end, the towed vehicle comprising a vehicle wheel; and a towing system comprising: a front lifting mechanism coupled to the front end of the towed vehicle, wherein the front lifting mechanism elevates the front end relative to a ground surface in an operable configuration; and a rear lifting mechanism coupled to the rear end of the towed vehicle, wherein the rear lifting mechanism elevates the rear end relative to the ground surface in an operable configuration; wherein the towed vehicle assembly is configurable in an pre-tow mode, wherein the vehicle wheel engages the ground surface, and a towable mode wherein each of the front lifting mechanism and rear lifting mechanism is in the operable configuration and the towing system elevates the vehicle wheel above the ground surface.

Also disclosed is a method of towing a towed vehicle, the method comprising providing a towed vehicle to be towed, the towed vehicle comprising a front end, a rear end, and a vehicle wheel; securing a front lifting mechanism to the front end of a towed vehicle and to a driven vehicle; securing a rear lifting mechanism to the rear end of the towed vehicle, the rear lifting mechanism comprising a rear tow wheel; configuring each of the front lifting mechanism and rear lifting mechanism in an operable configuration to elevate the vehicle wheel of the towed vehicle above a ground surface; and driving the driven vehicle to tow the towed vehicle across the ground surface, wherein the rear tow wheel rolls along the ground surface as the towed vehicle is towed.

A towing system is disclosed that comprises a first lifting mechanism comprising a mounting bracket, a trailer tongue, a threaded rod, and a lift connector coupling the trailer tongue to the mounting bracket, the lift connector movable relative to the mounting bracket between a raised orientation and a lowered orientation, the lift connector defining a threaded bore, the trailer tongue configured to connect a towable object to a driven vehicle; and a second lifting mechanism comprising a lift frame, an axle coupled to the lift frame, and a tow wheel rotatably coupled to the axle; wherein the first lifting mechanism is configurable in an operable configuration to elevate a first end of the towable object, and wherein the threaded rod is configured to rotate within the threaded bore in the operable configuration to move the lift connector from the raised orientation to the lowered orientation.

Also disclosed is a towing system comprising a first lifting mechanism configured to couple to a first end of a towable object, wherein the first lifting mechanism is configured to elevate the first end relative to a ground surface in an operable configuration, the first lifting mechanism comprising a threaded rod and a lift connector, the lift connector movable between a raised orientation and a lowered orientation and defining a threaded bore; and a second lifting mechanism configured to couple to a second end of the towable object, wherein the second lifting mechanism is configured to elevate the second end relative to the ground surface in an operable configuration; wherein: the towing system is configurable in a pre-tow mode and a towable mode; in the towable mode, each of the first lifting mechanism and second lifting mechanism is in the operable configuration and the towing system is configured to elevate the towable object above the ground surface; and the threaded rod is configured to rotate within the threaded bore in the operable configuration of the first lifting mechanism to move the lift connector from the raised orientation to the lowered orientation.

Additionally, disclosed is a towing system comprising a first lifting mechanism comprising a winch, the winch comprising a drum, a strap, and a drive mechanism, the winch configured to connect a first end of a towable object to a driven vehicle, the first lifting mechanism configurable in a first operable configuration, and wherein the drive mechanism rotates the drum and the strap is increasingly spooled around the drum to elevate the first end of the towable object in the first operable configuration; and a second lifting mechanism configurable in a second operable configuration, the second lifting mechanism configured to connect to a second end of the towable object and to elevate the second end relative to a ground surface in the second operable configuration.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
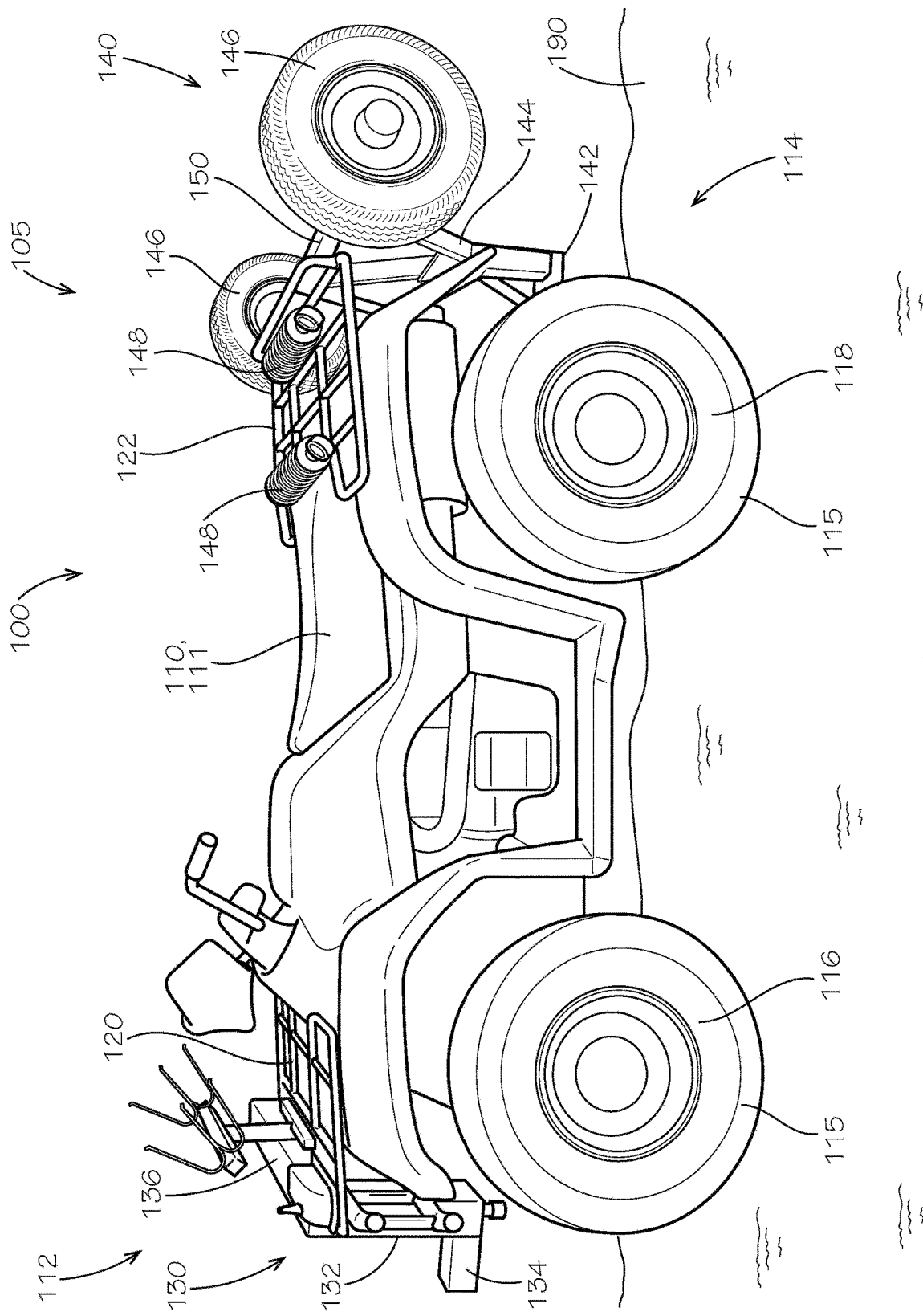
FIG. 1 is a side view of a towing system mounted to a towed vehicle in accordance with one aspect of the present disclosure, wherein the towing system comprises a front lifting mechanism and a rear lifting mechanism, each of which is shown in a storage configuration.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a towing system and associated methods, systems, devices, and various apparatus. Example aspects of the towing system can comprise one or both of a front lifting mechanism and a rear lifting mechanism. It would be understood by one of skill in the art that the towing system is described in but a few exemplary embodiments among many. No particular terminology or description should be considered limiting on the disclosure or the scope of any claims issuing therefrom.

FIG. 1 is a side view of a towing system 100, in accordance with one aspect of the present disclosure. As shown, in example aspects, the towing system 100 can be mounted to a towed vehicle 110 and can be configured to allow for towing of the towed vehicle 110. For example, in the present aspect, the towed vehicle 110 can be an ATV 111 (i.e., all-terrain vehicle); however, in other aspects, the towed vehicle 110 can be any other suitable vehicle or object that is capable of being towed by the towing system 100. For example and without limitation, the towed vehicle 110 can alternatively be a car, truck, utility vehicle, SUV (sport utility vehicle), boat, mobile home, camper, motorcycle, golf cart, construction vehicle, military vehicle, or the like. Furthermore, in some aspects, the towing system 100 can be configured to tow objects other than vehicles, such as, for example and without limitation, construction equipment, machine equipment, building structures, engines, or the like. As shown, the towed vehicle 110 can generally define a front end 112 and a rear end 114. The towed vehicle 110 can also comprise one or more vehicle wheels 115 configured to engage and roll along a ground surface 190, as shown. In the present aspects, the towed vehicle 110 can comprise one or more front vehicle wheels 116 proximate to the front end 112 and one or more rear vehicle wheels 118 proximate to the rear end 114. In example aspects, the towed vehicle 110 and the towing system 100 mounted thereto can together define a towed vehicle assembly 105.

According to example aspects, the towing system 100 can comprise one or both of a front lifting mechanism 130 and a rear lifting mechanism 140. The front lifting mechanism 130 can be mounted generally at or near the front end 112 of the towed vehicle 110, and the rear lifting mechanism 140 can be mounted generally at or near the rear end 114 of the towed vehicle 110. The front lifting mechanism 130 can be attached to a driven vehicle 1300 (shown in FIG. 13), which can be driven by a user to tow the towed vehicle 110. The front lifting mechanism 130 can be configured to elevate the front end 112 of the towed vehicle 110 above the ground surface 190 during towing, and similarly, the rear lifting mechanism 140 can be configured to elevate the rear end 114 of the towed vehicle 110 above the ground surface 190 during towing. When the front and rear ends 112, 114 of the towed vehicle 110 are elevated, the corresponding front and rear vehicle wheels 116, 118 can be raised up, relative to the orientation shown, and disengaged from the ground surface 190, such that the vehicle wheels 115 do not roll along the ground surface 190 during towing, as described in further detail below.

Figure 3:
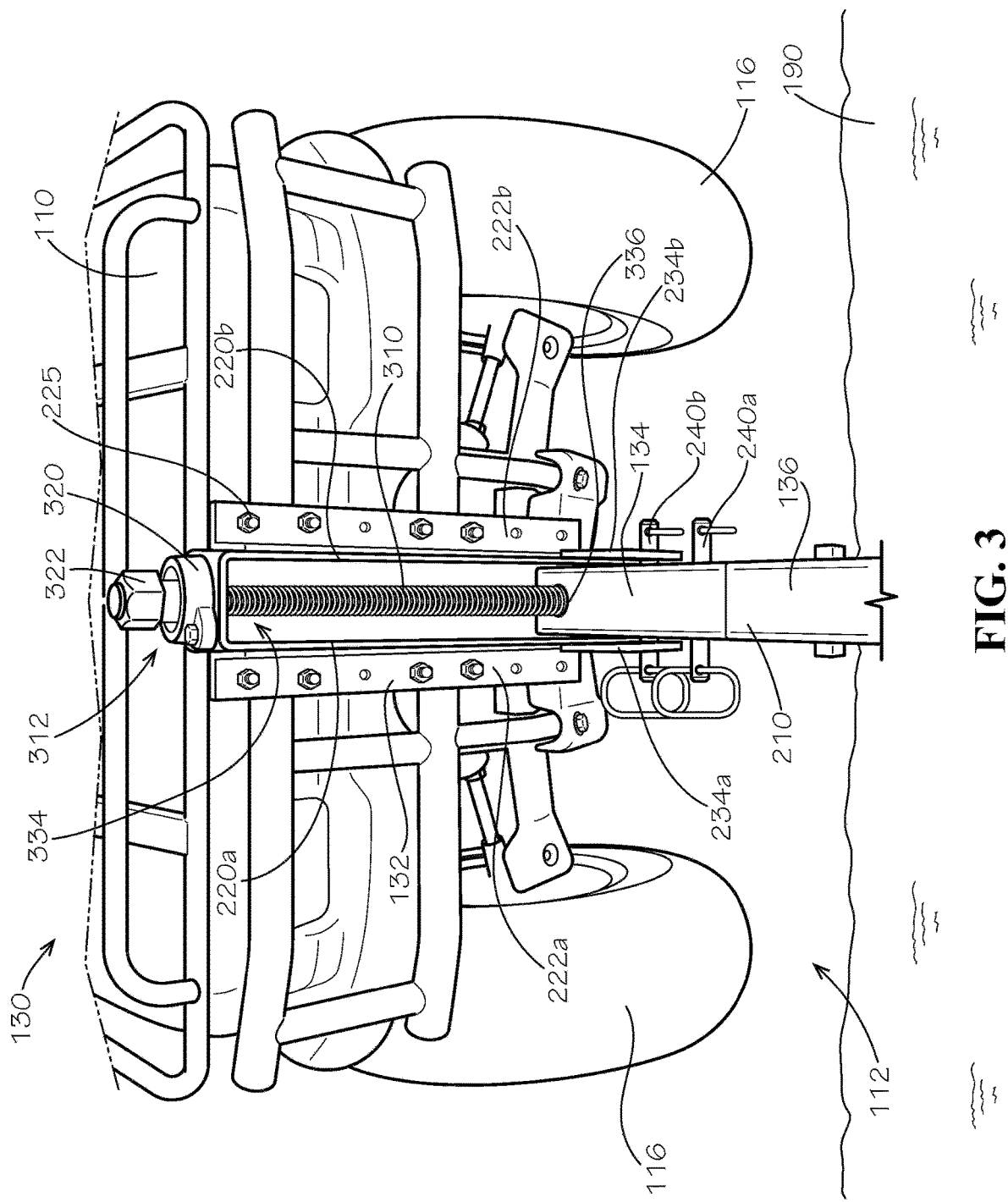
FIG. 3 is a front view of the front lifting mechanism of FIG. 1 in an operable configuration, wherein the lift connector of FIG. 2 is in a lowered position.
Figure 7:
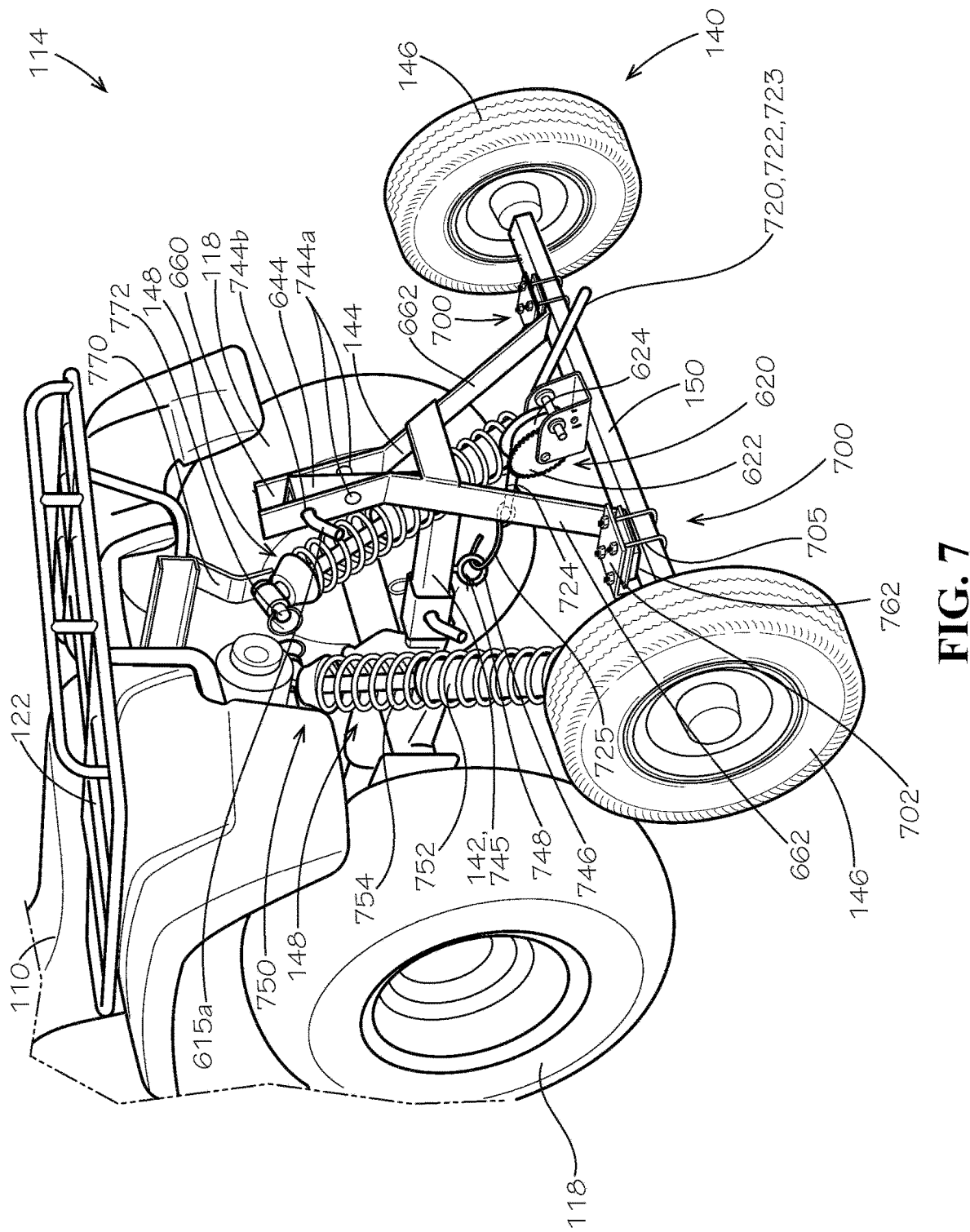
FIG. 7 is a left rear perspective view of the rear lifting mechanism of FIG. 1.
Figure 13:
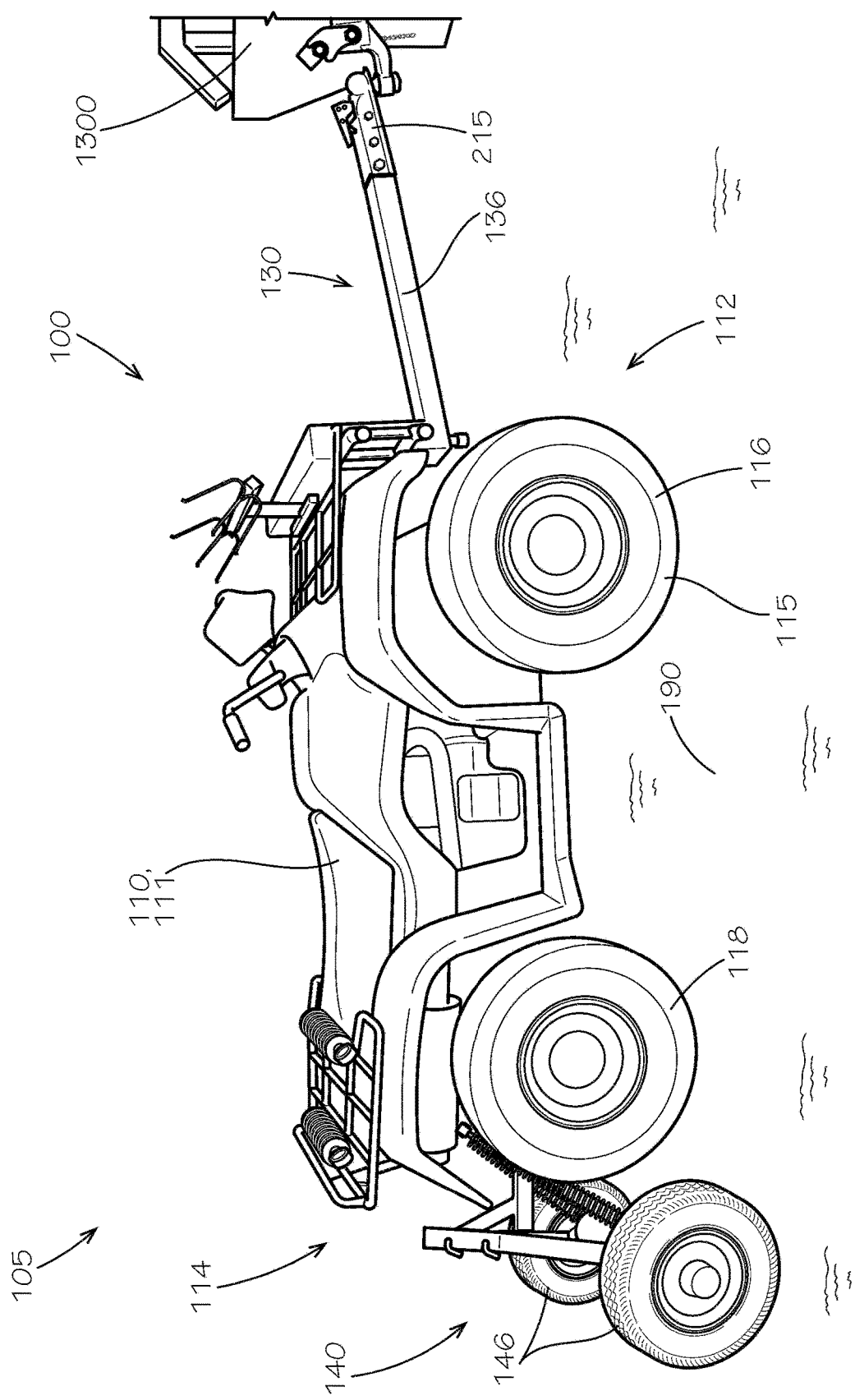
FIG. 13 is a side view of the towing system of FIG. 1 mounted to the towed vehicle of FIG. 1, wherein each of the front lifting mechanism and rear lifting mechanism is in the operable configuration.

Each of the front lifting mechanism 130 and rear lifting mechanism 140 is illustrated in a storage configuration in FIG. 1. The front and rear lifting mechanisms 130, 140 can also each be selectively oriented in an operable configuration, as illustrated in FIGS. 3 and 7, respectively. In the storage configuration, the front and rear lifting mechanisms 130, 140 do not elevate the towed vehicle 110, and therefore, the vehicle wheels 115 of the towed vehicle 110 can engage and roll along the ground surface 190. In example aspects, the front and/or rear lifting mechanisms 130, 140 may be mounted to the towed vehicle 110 in the storage configuration and then selectively reconfigured into the operable configuration. In other aspects, the front and/or rear lifting mechanisms 130, 140 may be mounted to the towed vehicle 110 in the operable configuration. According to example aspects, any configuration of the front and rear lifting mechanisms 130, 140 that is not the operable configuration can be considered an inoperable configuration. Thus, the storage configuration can be an inoperable configuration. In example aspects, the towed vehicle assembly 105 can be oriented in a pre-tow mode, as shown in the present FIG. 1, and a towable mode, as shown in FIG. 13. In the pre-tow mode, either or both of the front and rear lifting mechanisms 130, 140 can be in the inoperable configuration, and in the towable mode, both of the front and rear lifting mechanisms 130, 140 can be in the operable configuration.

As shown, example aspects of the front lifting mechanism 130 can comprise a mounting bracket 132, a lift connector 134, and a trailer tongue 136. The mounting bracket 132 can be mounted to the front end 112 of the towed vehicle 110 and the lift connector 134 can be movably coupled to the mounting bracket 132. In the storage configuration shown, the trailer tongue 136 may be detached from the front lifting mechanism 130 and can rest on a front frame rack 120 of the towed vehicle 110. In other aspects, the trailer tongue 136 may be secured to the front lifting mechanism 130 in the storage configuration. In the operable configuration of the front lifting mechanism 130, the trailer tongue 136 can be attached to the lift connector 134, and can further be attached to the driven vehicle 1300 to secure the towed vehicle 110 to the driven vehicle 1300. In some aspects, the trailer tongue 136 and the lift connector 134 can be separately formed, as shown, and in other aspects, the trailer tongue 136 and lift connector 134 can be monolithically formed as a singular component. Example aspects of the lift connector 134 can be configured to move relative to the mounting bracket 132 between a raised orientation and a lowered orientation. In the operable configuration, the lift connector 134 can be in the lowered orientation and the front end 112 of the towed vehicle 110 can be elevated above the ground surface 190. When the front end 112 is elevated, the front vehicle wheels 116 of the towed vehicle 110 can be elevated to disengage the ground surface 190. The operable configuration of the front lifting mechanism 130 is described in further detail below with respect to FIG. 3.

Example aspects of the rear lifting mechanism 140 can comprise a mounting hitch 142, a rear lift frame 144, and one or more rear tow wheels 146. In some aspects, the rear lifting mechanism 140 can further comprise one or more shock absorbers 148, which can be load-adjusting shock absorbers 148 in the present aspect. In the storage configuration, the shock absorbers 148 may be detached from the rear lifting mechanism 140, as shown, and can rest on a rear frame rack 122 of the towed vehicle 110. In other aspects, the shock absorbers 148 may be coupled to the rear lifting mechanism 140 in the storage configuration. The mounting hitch 142 can be mounted to the rear end 114 of the towed vehicle 110, and the rear lift frame 144 can be secured to the mounting hitch 142. The rear tow wheels 146 can be directly or indirectly rotatably mounted to the rear lift frame 144. In some aspects, such as the present aspect, the rear tow wheels 146 can be directly mounted on a rear axle 150, and the rear axle 150 can be secured to the rear lift frame 144. According to example aspects, the rear lift frame 144 can be configured to move relative to the mounting hitch 142 between a raised orientation, as shown, and a lowered orientation, as shown in FIG. 7. In the raised orientation, the rear lifting mechanism 140 can be secured in the storage configuration, and in the lowered orientation, the rear lifting mechanism 140 can be secured in the operable configuration. In the operable configuration, the rear tow wheels 146 of the rear lifting mechanism 140 can engage the ground surface 190, and the rear end 114 of the towed vehicle 110 can be elevated above the ground surface 190. When the rear end 114 is elevated, the rear vehicle wheels 118 can be elevated to disengage the ground surface 190. The rear tow wheels 146 of the rear lifting mechanism 140 can be configured to roll across the ground surface 190 during towing.

Figure 2:
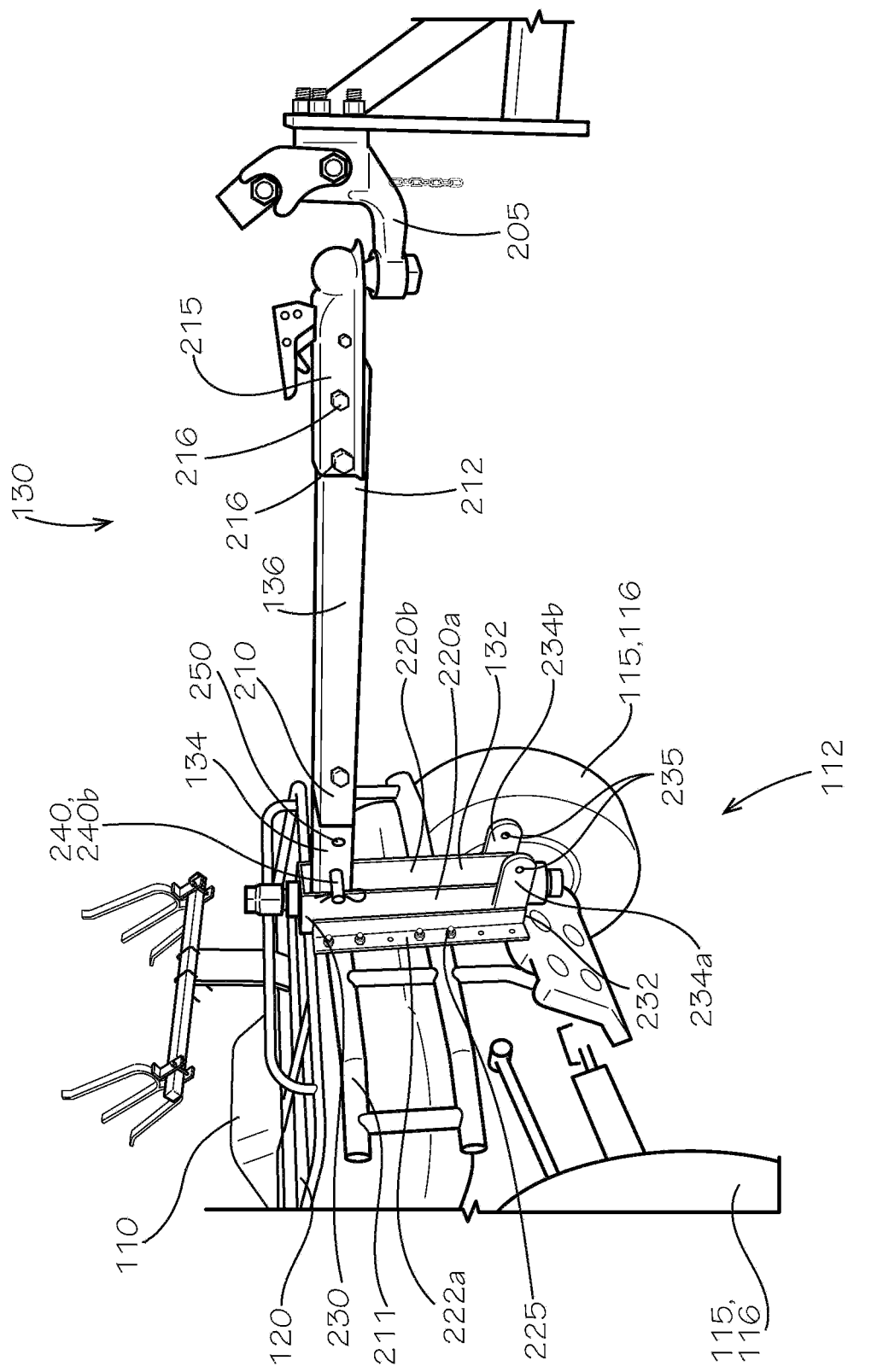
FIG. 2 is a front perspective view of the front lifting mechanism of FIG. 1, wherein a lift connector of the front lifting mechanism is in a raised position.

FIG. 2 illustrates the trailer tongue 136 secured to the lift connector 134 and the lift connector 134 in the raised orientation. In this configuration, the front lifting mechanism 130 can be attached to the driven vehicle 1300 (shown in FIG. 13). For example, in the present aspect, the trailer tongue 136 can be secured to a ball mount 205 of the driven vehicle 1300. The driven vehicle 1300 may be capable of towing the towed vehicle 110 with the lift connector 134 in the raised orientation; however, the front vehicle wheels 116 of the towed vehicle 110 remain engaged with the ground surface 190 in the raised orientation, and thus, the front vehicle wheels 116 would roll along the ground surface 190 if towed in this orientation. According to example aspects, the trailer tongue 136 can define a first tongue end 210 coupled to the lift connector 134 and a second tongue end 212 distal to the lift connector 134. As shown, the front lifting mechanism 130 can comprise a trailer hitch 215 coupled to the trailer tongue 136 at the second tongue end 212 thereof. The trailer hitch 215 can be releasably secured to the ball mount 205 of the driven vehicle 1300 to selectively attach and detach the towed vehicle 110 to and from the driven vehicle 1300. The trailer hitch 215 can be secured to the second tongue end 212 of the trailer tongue 136 by one or more fasteners. In the present aspect, the fasteners can be a plurality of nut and bolt assemblies 216. Additionally, example aspects of the mounting bracket 132 can comprise a first flange 222a extending from a first sidewall 220a thereof and a second flange 222b (shown in FIG. 3) extending from a second sidewall 220b thereof. One or more fasteners can be configured to extend through flange openings 422 (shown in FIG. 4) in each of the first and second flanges 222a,b to engage the towed vehicle 110 and secure the front lifting mechanism 130 thereto. The fasteners can be any suitable fastener known in the art, including but not limited to U-bolt assemblies 225, as shown. In the present aspect, the U-bolt assemblies 225 can secure the mounting bracket 132 to a pair of horizontal frame members 211 of the towed vehicle 110. In other aspects, the fasteners can comprise traditional nut and bolt assemblies, screws, rivets, welding, or the like.

Figure 4:
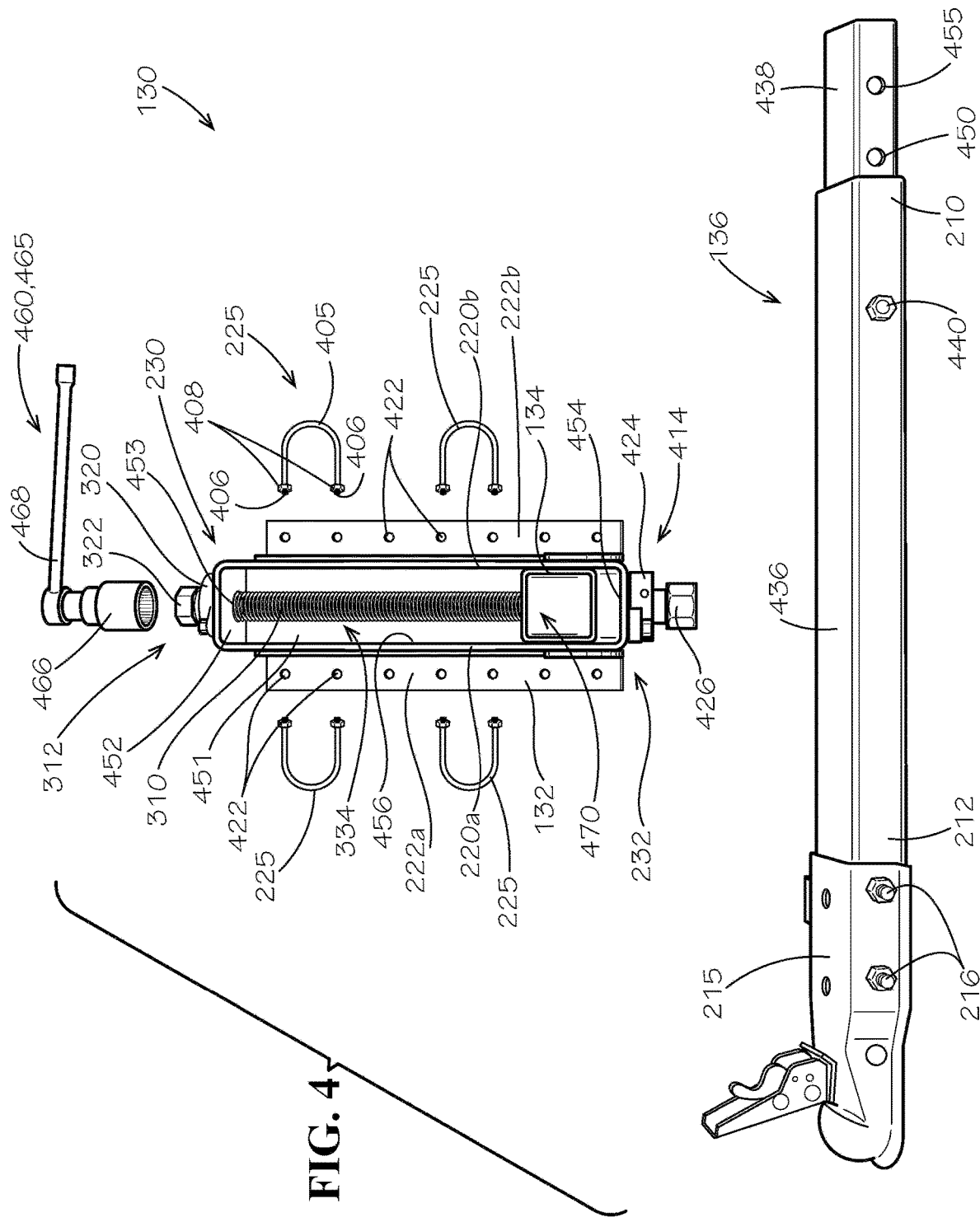
FIG. 4 is a partially exploded view of the front lifting mechanism of FIG. 1.
Figure 5:
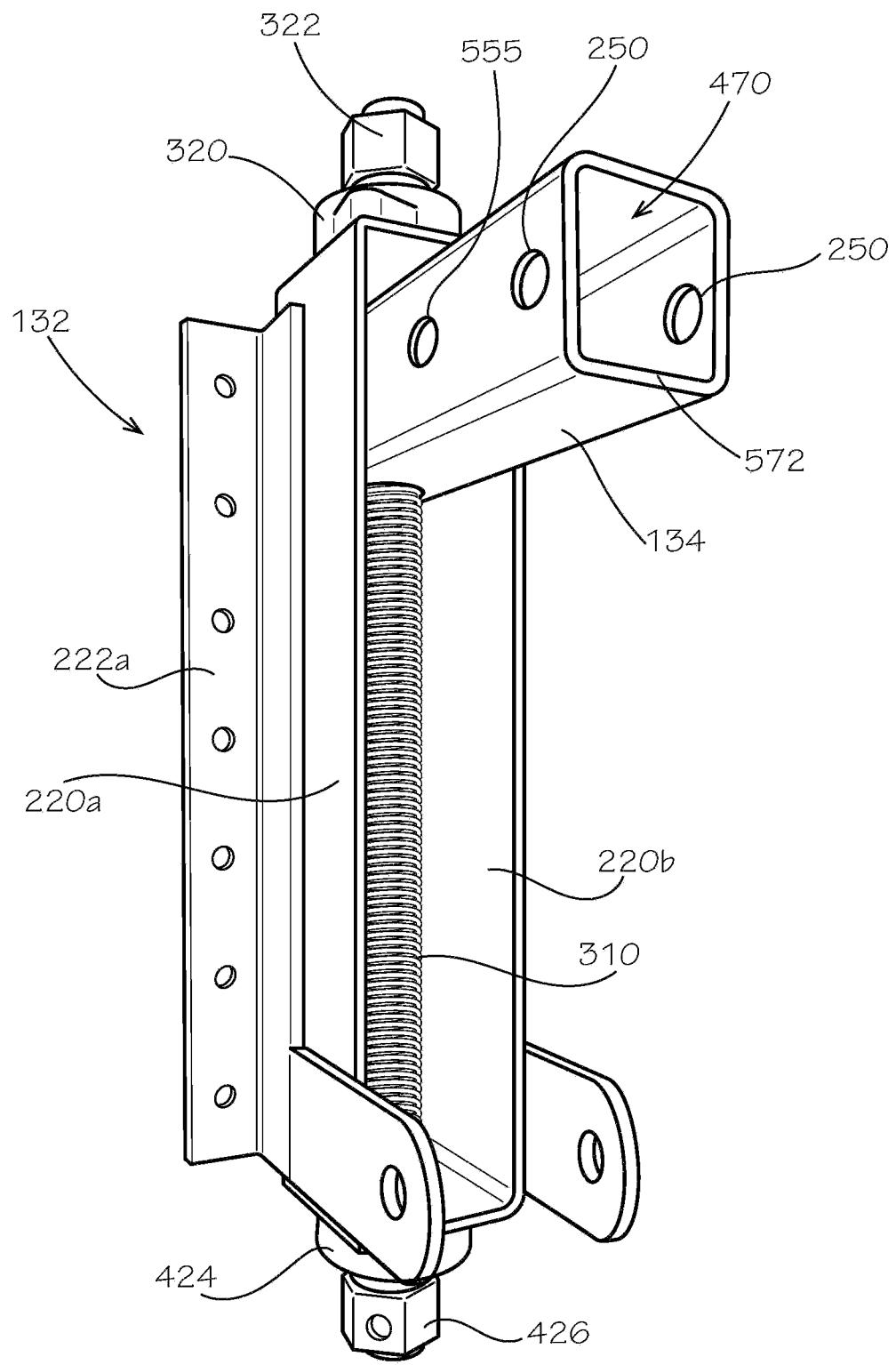
FIG. 5 is a perspective view of the lift connector of FIG. 2 coupled to a mounting bracket of the front lifting mechanism of FIG. 1.

According to example aspects, the first tongue end 210 of the trailer tongue 136 can be secured to the lift connector 134 by one or more fasteners, such as one or more hitch pins 240. For example, the hitch pins 240 can comprise a front hitch pin 240a (shown in FIG. 3) and a rear hitch pin 240b. The front hitch pin 240a can be configured to extend through corresponding front connector holes 250 and front tongue holes 450 formed in the lift connector 134 and trailer tongue 136, respectively. Similarly, the rear hitch pin 240b can be configured to extend through corresponding and rear connector holes 555 and rear tongue holes 455 formed in the lift connector 134 and trailer tongue 136, respectively. The front and rear tongue holes 450,455 of the trailer tongue 136 are shown in FIG. 4, and the rear connector holes 555 of the lift connector 134 are shown in FIG. 5. Other aspects of the fasteners may not be the hitch pins 240, and can be any other suitable fastener known in the art. In example aspects, one of the hitch pins 240, such as the rear hitch pin 240b, can also be configured to selectively lock the lift connector 134 in the lowered orientation. For example, as shown, the mounting bracket 132 can generally define an upper bracket end 230 a lower bracket end 232. A first locking ear 234a can extend from the first sidewall 220a at or near the lower bracket end 232 of the mounting bracket 132, and a second locking ear 234b can extend from the second sidewall 220b at or near the lower bracket end 232. Each of the first and second locking ears 234a,b can define a locking hole 235 formed therethrough. When the lift connector 134 is in the lowered orientation, as shown in FIG. 3, the lift connector 134 can be oriented between the first and second locking ears 234a,b, and the rear hitch pin 240b can further extend through the locking holes 235 to secure the lift connector 134 in the lowered orientation.

Referring to FIG. 3, the front lifting mechanism 130 is shown in the operable configuration. As shown, the front lifting mechanism 130 can comprise a threaded rod 310 mounted within the mounting bracket 132. For example, the threaded rod 310 can be mounted within a bracket channel 334 defined between the first and second sidewalls 220a,b. In some aspects, such as the present aspect, the threaded rod 310 can be rotatably mounted to the mounting bracket 132 by an upper bearing 320 and a lower bearing 424 (shown in FIG. 4). Furthermore, an upper nut 322 can be coupled to an upper rod end 312 of the threaded rod 310 external to the bracket channel 334, and a lower nut 426 (shown in FIG. 4) can be coupled to a lower rod end 414 (shown in FIG. 4) of the threaded rod 310 external to the bracket channel 334. For example, in some aspects, each of the upper and lower nuts 322,426 can be welded to the corresponding upper and lower rod ends 312,414 of the threaded rod 310. In other aspects, the upper and lower nuts 322,426 can be fastened to the threaded rod 310 by any other suitable fastener known in the art.

As shown, the lift connector 134 can extend into the bracket channel 334 and can define a threaded bore 336 therethrough. The threaded rod 310 can extend through the threaded bore 336 of the lift connector 134, and the threading of the threaded rod 310 can mate with the threading of the threaded bore 336. According to example aspects, the upper nut 322 (and/or the lower nut 426) can be rotated to rotate the threaded rod 310 relative to the mounting bracket 132. As the threaded rod 310 rotates, the lift connector 134 threadably mounted on the threaded rod 310 can move between the raised and lowered orientations within the bracket channel 334 depending upon the direction that the threaded rod 310 is turned. In example aspects, when the lift connector 134 moves from the raised orientation to the lowered orientation, the trailer tongue 136 and the lift connector 134 can remain static relative to the driven vehicle 1300 (shown in FIG. 13). As such, the threaded rod 310 can move upward through the threaded bore 336 of the lift connector 134, relative to the orientation shown, as the lift connector 134 remains stationary. Because the threaded rod 310 is affixed to the mounting bracket 132 by the upper and lower bearings 320,424, the upward movement of the threaded rod 310 can in turn elevate the mounting bracket 132. As described above, the mounting bracket 132 can be secured to the front end 112 of the towed vehicle 110 by the U-bolt assemblies 225, and thus, as the mounting bracket 132 can be elevated relative to the ground surface 190, the front end 112 of the towed vehicle 110 can be elevated. As shown, the front vehicle wheels 116 of the towed vehicle 110 can disengage the ground surface 190 as the front end 112 thereof is elevated. In other aspects, the front lifting mechanism 130 can comprise any other suitable lifting device known in the art for elevating the front end 112 of the towed vehicle 110, including, but not limited to, a hydraulic jack, screw jack, pulley system, winch, trolley jack, scissor jack, bottle jack, joist, crane, mechanical jack, electric jack, pneumatic jack, or the like.

Also shown in FIG. 3 are the front and rear hitch pins 240a,b. According to example aspects, the front and rear hitch pins 240a,b can extend through the corresponding front and rear holes 250,555,450,455 (shown in FIGS. 2, 4, and 5) formed in the lift connector 134 and the trailer tongue 136, respectively, to secure the trailer tongue 136 to the lift connector 134 at the first tongue end 210 thereof. In example aspects, the rear hitch pin 240b can further lock the lift connector 134 in position relative to the mounting bracket 132 in the lowered orientation. As shown, in the lowered orientation, the lift connector 134 can be oriented between the first and second locking ears 234a,b, and the rear hitch pin 240b can further extend through the locking holes 235 (shown in FIG. 2) of the first and second locking ears 234a,b to selectively lock the lift connector 134 in the lowered orientation. To move the lift connector 134 back to the raised orientation, the rear hitch pin 240b can be removed from the front lifting mechanism 130, detaching the lift connector 134 and the trailer tongue 136 from the first and second locking ears 234a,b. The upper nut 322 can be rotated to raise the lift connector 134 to the raised orientation, and the front hitch pin 240a can ensure the trailer tongue 136 remains secured to the lift connector 134 as the lift connector 134 is raised. As the lift connector 134 moves from the lowered orientation back to the raised orientation, the front end 112 of the towed vehicle 110 can be lowered towards the ground surface 190. The rear hitch pin 240b can be inserted back through the corresponding rear holes 455,555 in the trailer tongue 136 and lift connector 134 after the rear holes 455,555 have cleared the first and second locking ears 234a,b or once the lift connector 134 reaches the raised orientation, whichever the user desires.

FIG. 4 illustrates a partially exploded view of the front lifting mechanism 130. As shown, the front lifting mechanism 130 can comprise the mounting bracket 132, the lift connector 134, and the trailer tongue 136. The trailer hitch 215 can be coupled to the trailer tongue 136 at the second tongue end 212 by the nut and bolt assemblies 216. In some aspects, the trailer tongue 136 can comprise an outer tongue 436 and an inner tongue 438 partially received within the outer tongue 436 at the first tongue end 210. The inner tongue 438 can be secured to the outer tongue 436 by one or more fasteners, such as a nut and bolt assembly 440, or any other suitable fastener known in the art. As shown, in the present aspect, the front and rear holes 450,455 of the trailer tongue 136 can be formed in the inner tongue 438. Other aspects of the trailer tongue 136 may not comprise the inner tongue 438, and can comprise the outer tongue 436 only. In such an instance, the front and rear holes 450,455 can be formed through the outer tongue 436. In the present aspect, each of the inner tongue 438 and outer tongue 436 can comprise a substantially rectangular cross-sectional shape; however, in other aspects, the inner tongue 438 and/or outer tongue 436 can define any other suitable cross-sectional shape, including, but not limited to, circular and triangular.

Referring to the mounting bracket 132, each of the first and second flanges 222a,b can extend from the corresponding first and second sidewalls 220a,b. Each of the first and second flanges 222a,b can define a plurality of the flange openings 422, and the U-bolt assemblies 225 can be provided for extending through the corresponding flange openings 422 to secure the mounting bracket 132 to the towed vehicle 110 (shown in FIG. 1). As shown, each of U-bolt assemblies 225 can comprise a U-bolt 405 defining opposing bolt ends 406, and a nut 408 threadably attached to each of the opposing bolt ends 406. The bracket channel 334 can be defined by the first and second sidewalls 220a,b, and can further be defined by a rear wall 451, a top wall 452, and a bottom wall 454, each of which can extend between the first and second sidewalls 220a,b. An open front end 456 of the mounting bracket 132 can allow access to the bracket channel 334. As shown, the threaded rod 310 can extend fully through a length of the bracket channel 334, and can pass through a top wall hole 453 formed in the top wall 452 and a bottom wall hole (not shown) formed in the bottom wall 454. According to example aspects, the upper bearing 320 can be mounted to the top wall 452 external to the bracket channel 334, and the lower bearing 424 can be mounted to the bottom wall 454 external to the bracket channel 334. The threaded rod 310 can be rotatably coupled to the mounting bracket 132 at the upper bracket end 230 by the upper bearing 320 and at the lower bracket end 232 by the lower bearing 424. The upper nut 322 can be secured to the threaded rod 310 at the upper rod end 312 thereof, such that the upper bearing 320 can be oriented between the top wall 452 and the upper nut 322. Similarly, the lower nut 426 can be secured to the threaded rod 310 at the lower rod end 414 thereof, such that the lower bearing 424 can be oriented between the bottom wall 454 and the lower nut 426, as shown.

In some aspects, a tool 460 may be provided for use in rotating the upper nut 322 (and/or lower nut 426), which in turn can rotate the threaded rod 310 to move the lift connector 134 between the raised and lowered orientations, as described above. (The lift connector 134 is shown in the lowered orientation in the present aspect.) Example aspects of the tool 460 can be a socket wrench 465, as shown, or any other suitable tool known in the art. The socket wrench 465 can comprise a socket 466 configured to removably receive the upper nut 322 therein, and a handle 468 that can be manually gripped and turned in order to rotate the socket wrench 465. The socket 466 can grip the upper nut 322 as the socket wrench 465 is rotated, thus rotating the upper nut 322, and therefore rotating the threaded rod 310, along with the socket wrench 465.

As shown, the lift connector 134 can define a substantially rectangular cross-sectional shape in the present aspect. In other aspects, the lift connector 134 can define any other suitable cross-sectional shape, including, but not limited to, circular and triangular. The lift connector 134 can define a connector cavity 470, which can be sized and shaped to receive the inner tongue 438 of the trailer tongue 136 therein. FIG. 5 illustrates a perspective view of the mounting bracket 132 and lift connector 134, wherein the lift connector 134 is in the raised orientation. As shown, the lift connector 134 can define a cavity opening 572, which can allow access to the connector cavity 470. The portion of the inner tongue 438 (shown in FIG. 4) extending from the outer tongue 436 (shown in FIG. 4) can be inserted through the cavity opening 572 into the connector cavity 470, and the front and rear holes 450,455 (shown in FIG. 4) of the inner tongue 438 can be aligned with the front and rear holes 250,555, respectively, of the lift connector 134. The front and rear hitch pins 240a,b (shown in FIG. 3) can be configured to extend through the front and rear holes 250, 455, respectively, of the lift connector 134 and the front and rear holes 450,455, respectively, of the inner tongue 438 to couple the trailer tongue 136 (shown in FIG. 1) to the lift connector 134.

Figure 6:
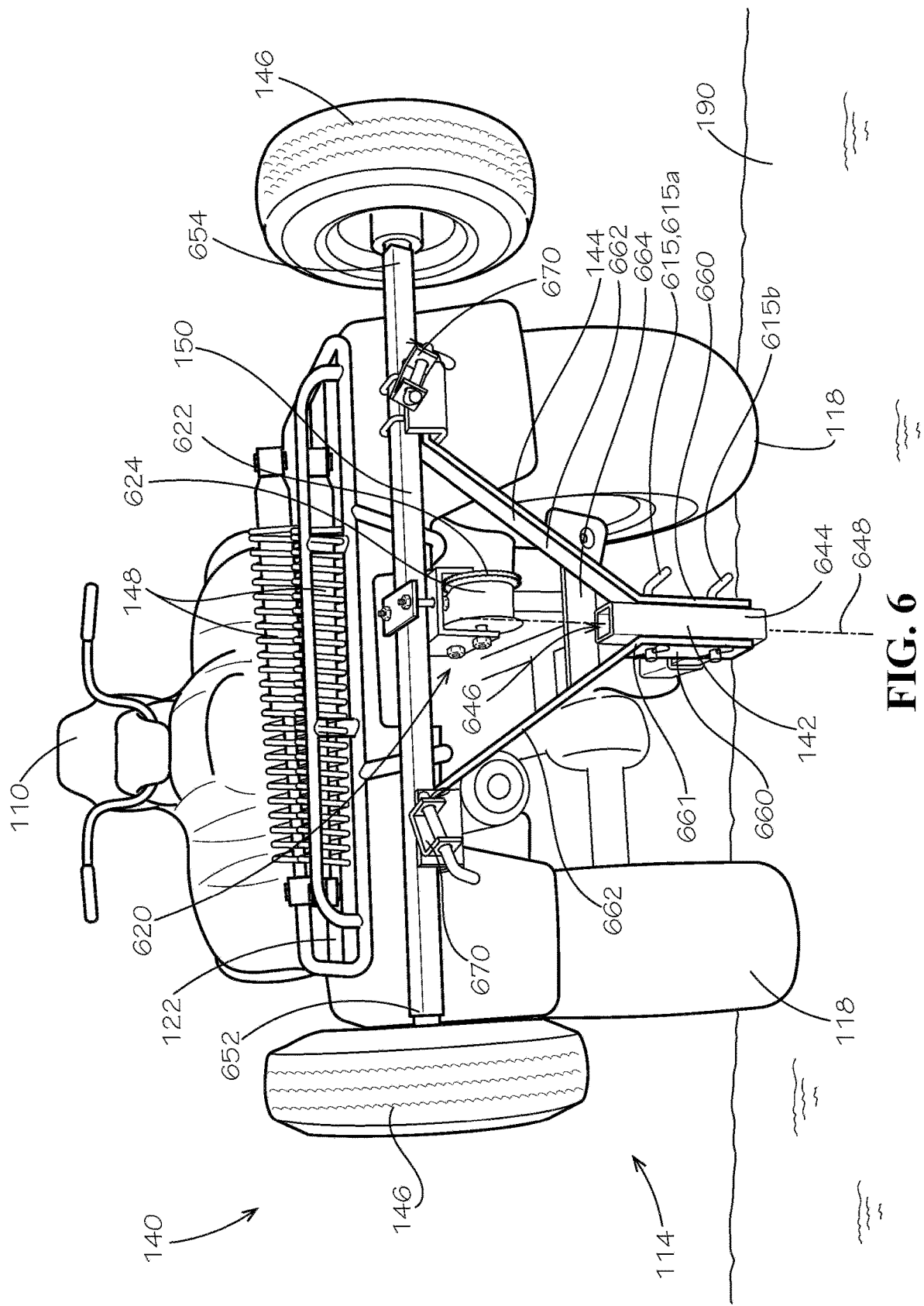
FIG. 6 is a rear view of the rear lifting mechanism of FIG. 1 in the storage configuration.
Figure 10:
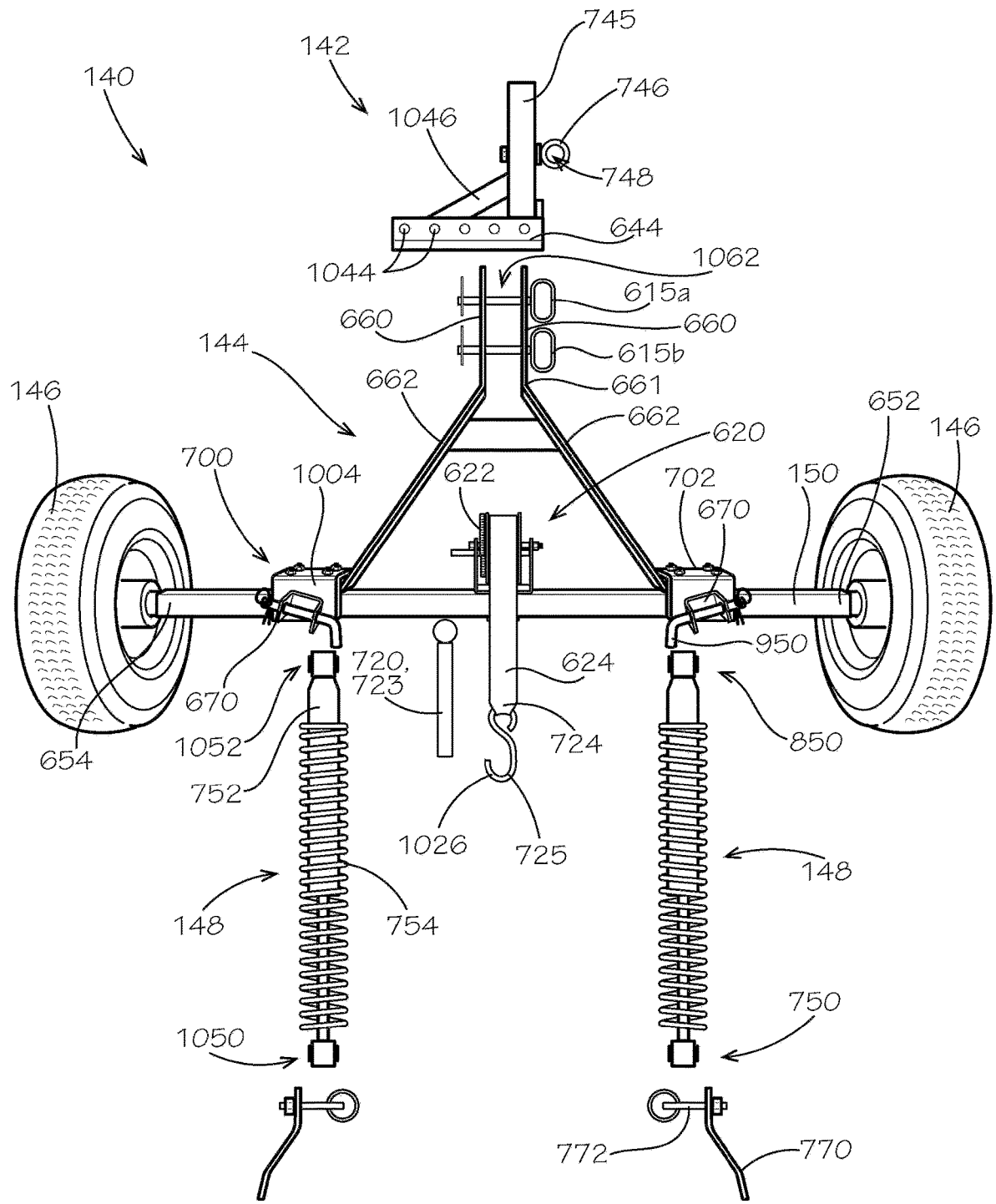
FIG. 10 is a partially exploded view of the rear lifting mechanism of FIG. 1.

FIG. 6 is a front view of the rear lifting mechanism 140 in the storage configuration. As shown, the mounting hitch 142 can be coupled to the rear end 114 of the towed vehicle 110. In some aspects, the mounting hitch 142 may already be provided on the towed vehicle 110, while in other aspects, the mounting hitch 142 can be provided as part of the rear lifting mechanism 140. In the present aspect, the mounting hitch 142 can define a hitch column 644, which can be oriented substantially upright, relative to the orientation shown (i.e., substantially vertical relative to the ground surface 190). The hitch column 644 can define a substantially rectangular cross-sectional shape and can define a hitch cavity 646 formed therethrough. A hitch axis 648 can extend through a center of the hitch cavity 646. According to example, aspects, the rear lift frame 144 can be selectively coupled to the hitch column 644 of the mounting hitch 142 in the storage configuration by one or more fasteners, such as one or more hitch pins 615. For example, the hitch pins 615 can comprise an upper hitch pin 615a and a lower hitch pin 615b, which can be configured to extend through corresponding upper and lower holes 744a,b formed in the rear lift frame 144 and corresponding holes 1044 formed in the hitch column 644. The holes 1044 of the hitch column 644 are shown in FIG. 10, and the upper and lower holes 744a,b of the rear lift frame 144 are best shown in FIG. 7. In example aspects, the rear lift frame 144 can generally define a Y-shape, as shown. The Y-shaped rear lift frame 144 can comprise a pair of parallel frame legs 660, which can be oriented on opposing sides of the hitch column 644 and secured thereto by the hitch pins 615. The parallel frame legs 660 can be substantially parallel with the hitch axis 648, as shown. The rear lift frame 144 can further comprise a frame arm 662 extending from a proximal end 661 of each of the frame legs 660. In the present aspect, the frame arms 662 can be oriented at an acute angle relative to the hitch axis 648, and can extend substantially upward from the frame legs 660, relative to the orientation shown, in the storage configuration. In some aspects, a frame cross-member 664 can extend between the frame arms 662 to couple the frame arms 662 together.

According to example aspects, the rear axle 150 can be secured to the frame arms 662 of the rear lift frame 144 distal to the frame legs 660, as described in further detail below with reference to FIG. 7. As shown, the rear axle 150 can extend substantially perpendicular to the hitch axis 648 and can define a first axle end 652 and a second axle end 654 opposite the first axle end 652. A first one of the rear tow wheels 146 can be rotatably mounted to the rear axle 150 at the first axle end 652, and a second one of the rear tow wheels 146 can be rotatably mounted to the rear axle 150 at the second axle end 654. In other aspects, the rear tow wheels 146 can be directly mounted to the rear lift frame 144 and/or the rear axle 150 can be integral with the rear lift frame 144. In the storage configuration, as shown, the rear tow wheels 146 can be elevated above the ground surface 190, and the rear vehicle wheels 118 of the towed vehicle 110 can engage the ground surface 190. In example aspects, the rear axle 150 can be any suitable type of axle known in the art, including but not limited to, a drop axle, torsion, axle, or spring axle, or the rear lifting mechanism 140 can comprise an axle-less trailer suspension, for example.

As shown, a winch 620 can be mounted to the rear axle 150. In the present aspect, the winch 620 can be oriented substantially centrally on the rear axle 150 between the opposing rear tow wheels 146. Example aspects of the winch 620 can comprise a drum 622, a strap 624 (or a cable, rope, or the like) wrapped around the drum 622, and a drive mechanism 720 (shown in FIG. 7) for driving rotation of the drum 622. In the present aspect, the drive mechanism 720 can be a hand crank 722 (shown in FIG. 7), while in other aspects, the drive mechanism 720 can be any other suitable drive mechanism known in the art, including, but not limited to, a motor. The winch 620 can further comprise a fastener, such as a hook 725 (shown in FIG. 7) secured to the strap 624 and configured to be selectively attached to the mounting hitch 142. However, in the storage configuration, the hook 725 may not yet be attached to the mounting hitch 142. The winch 620 can be operated to elevate the rear end 114 of the towed vehicle 110 above the ground surface 190 and to orient the rear lifting mechanism 140 to the operable configuration, as described in further detail below. In other aspects, the rear lifting mechanism 140 can comprise any other suitable lifting device known in the art for elevating the rear end 114 of the towed vehicle 110, including, but not limited to, a hydraulic jack, screw jack, pulley system, trolley jack, scissor jack, bottle jack, joist, crane, mechanical jack, electric jack, pneumatic jack, or the like.

Example aspects of the rear lifting mechanism 140 can also comprise the shock absorbers 148, which, in the storage configuration, may be detached from the rear lifting mechanism 140, as shown. For example, in the present aspect, the shock absorbers 148 can rest on the rear frame rack 122 of the towed vehicle 110 in the storage configuration, until it is desired to orient the rear lifting mechanism 140 in in the operable configuration. As shown, a pair of lower shock brackets 670 can mounted to the rear axle 150. Each of the lower shock brackets 670 can be oriented proximate to a corresponding one of the frame arms 662, as shown, though in other aspects, the lower shock brackets 670 can be oriented elsewhere along the rear axle 150. In the operable configuration, each of the shock absorbers 148 can be coupled to the towed vehicle 110 and to a corresponding one of the lower shock brackets 670, as described in further detail below.

FIG. 7 illustrates the rear lifting mechanism 140 as it is being reconfigured from the storage configuration to the operable configuration. In example aspects, the upper and lower hitch pins 615a,b (lower hitch pin 615b shown in FIG. 6) can be removed to detach the rear lift frame 144 from the hitch column 644 of the mounting hitch 142. The rear lift frame 144 can then be reoriented relative to the mounting hitch 142, such that the rear tow wheels 146 can engage the ground surface 190, as shown. A one of the upper and lower hitch pins 615a,b can then reattach the rear lift frame 144 to the hitch column 644 with the rear tow wheels 146 contacting the ground surface 190. As such, the rear lift frame 144 can be oriented in the lowered orientation. In the present aspect, the upper hitch pin 615a can engage the lower holes 744b formed in the frame legs 660 of the rear lift frame 144 and a corresponding one of the holes 1044 (shown in FIG. 10) formed in the hitch column 644 to reattach the rear lift frame 144 thereto. In example aspects, the rear lift frame 144 can be configured to pivot about the upper hitch pin 615a in the present configuration, as is described in further detail below. Furthermore, in some aspects, instead of removing both of the upper and lower hitch pins 615a,b to reorient the rear lift frame 144, only one of the upper and lower hitch pins 615a,b can be removed, and the rear lift frame 144 can pivot about the remaining upper or lower hitch pins 615a,b to the present lowered orientation. As shown, in the present orientation, the rear lift frame 144 can be angled outward relative to the hitch column 644, away from the rear end 114 of the towed vehicle 110.

According to example aspects, coupling brackets 700 can be provided for clamping each of the frame arms 662 of the rear lift frame 144 to the rear axle 150. In the present aspect, the coupling brackets 700 can be substantially L-shaped, defining an upper plate 702 and a rear plate 1004 (shown in FIG. 10). Each of the lower shock brackets 670 (shown in FIG. 6) can be coupled to a corresponding one of the rear plates 1004. As shown, a distal end 762 of each of the frame arms 662 can be bent to extend along a portion of the rear axle 150. The bent distal end 762 of each frame arm 662 can be positioned between the rear axle 150 and the upper plate 702 of the corresponding coupling bracket 700. One or more fasteners can be provided for securing the coupling brackets 700 to the rear axle 150, clamping the distal ends 762 of the frame arms 662 therebetween and thereby securing the frame arms 662 to the rear axle 150. In the present aspect, the fasteners can be U-bolt assemblies 705, which can be substantially similar to the U-bolt assemblies 225 described above. The U-bolt 405 of each U-bolt assembly 705 can wrap around the rear axle 150 and extend through openings (not shown) formed in the upper plate 702. The corresponding nuts 408 can be threaded onto the U-bolts 405 and tightened against the upper plate 702 to secure the distal ends 762 of the frame arms 662 to the rear axle 150. In some aspects, the U-bolts 405 may also extend through openings (not shown) formed in the distal ends 762 to further improve the attachment of the rear lift frame 144 to the rear axle 150. In other aspects, the fasteners can be any other suitable fastener known in the art, including but not limited to, traditional nut and bolt assemblies, screws, rivets, and the like.

Figure 8:
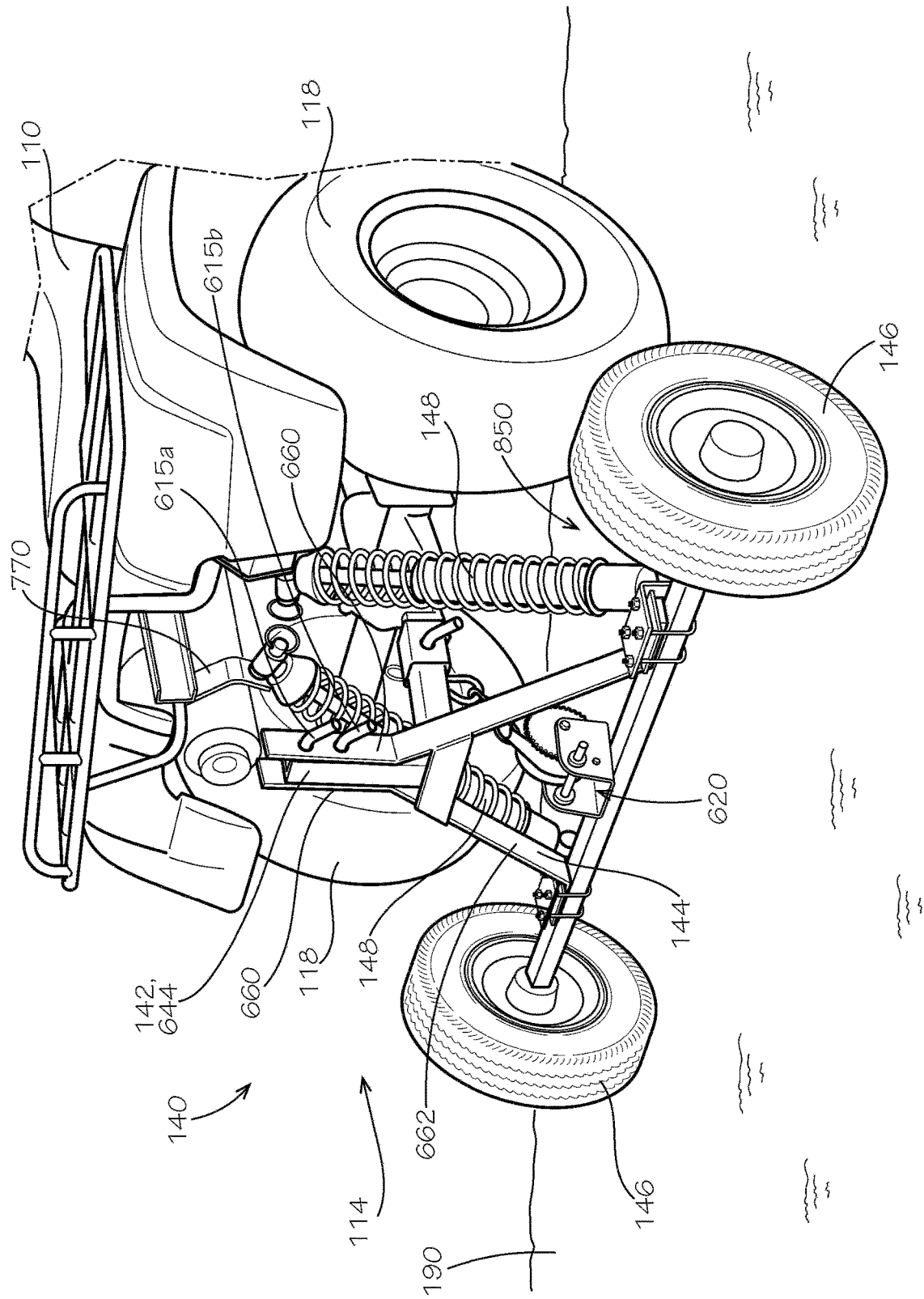
FIG. 8 is a right rear perspective view of the rear lifting mechanism of FIG. 1 in an operable configuration.
Figure 9:
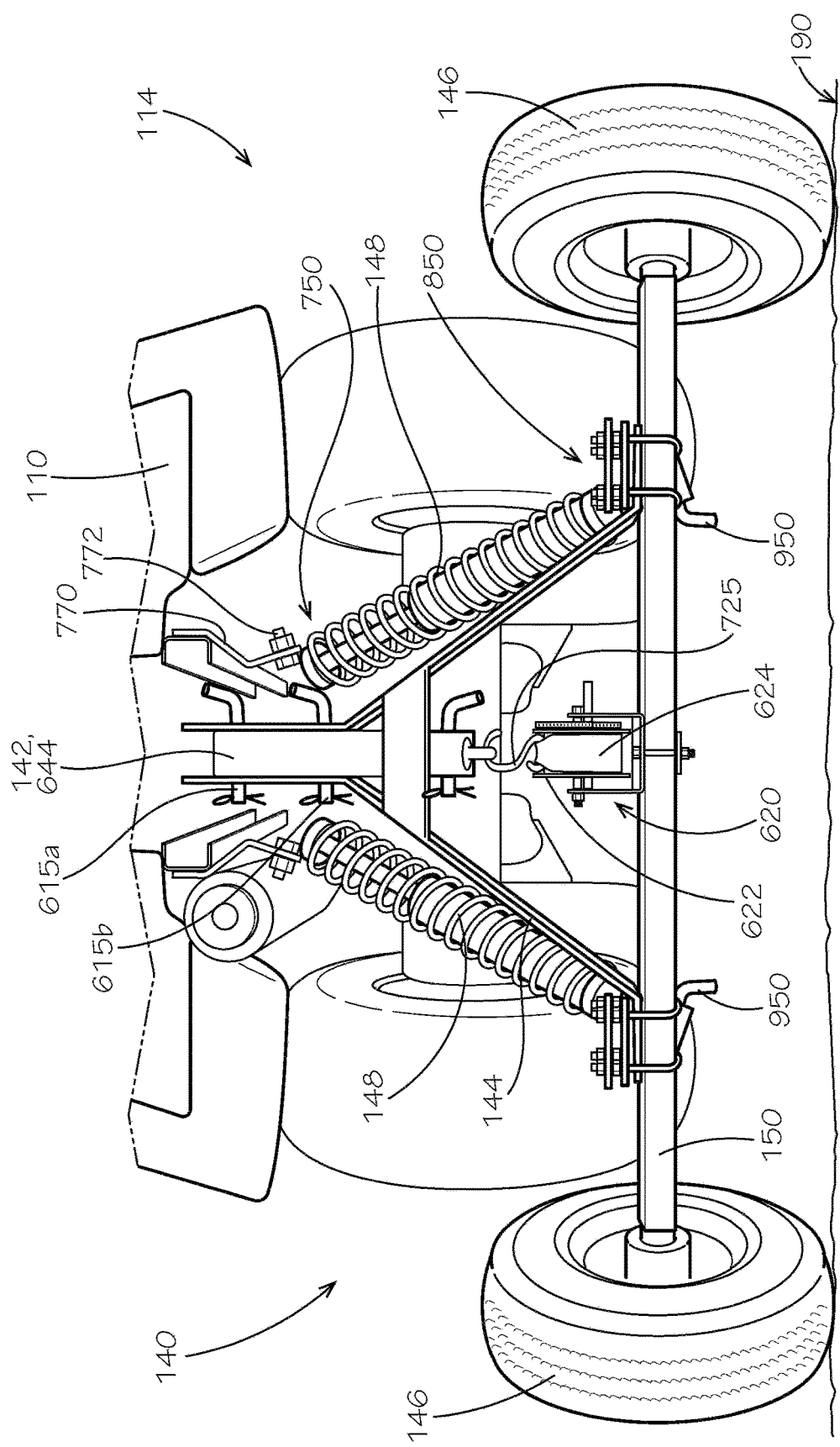
FIG. 9 is a rear view of the rear lifting mechanism of FIG. 1 in the operable configuration.

As shown, the hook 725 of the winch 620 can be secured to an outer end 724 of the strap 624. The hook 725 can be pulled toward the mounting hitch 142, which can rotate the drum 622 in a first direction to unravel the strap 624 therefrom. The hook 725 can then be releasably secured to the mounting hitch 142. According to example aspects, the mounting hitch 142 can comprise a hitch connector 745, which can be secured to the rear end 114 of the towed vehicle 110 and can connect the hitch column 644 thereto. The hitch connector 745 can be oriented about perpendicular to the hitch column 644 in the present aspect. As shown, the hook 725 can be releasably secured to the hitch connector 745. For example, in the present aspect, the mounting hitch 142 can comprise an eyebolt 746 secured to the hitch connector 745, and the hook 725 can engage an eyebolt opening 748 of the eyebolt 746, as shown. In other aspects, the hook 725 can be releasably secured to the mounting hitch 142 in any other suitable fashion. The hand crank 722 can also be provided for rotating the drum 622 in a reverse, second direction opposite the first direction. In the present aspect, the hand crank 722 can be a wrench 723 configured to releasably engage the winch 620. In other aspects, the hand crank 722 may be permanently affixed to the winch 620. Because the hook 725 is secured to the mounting hitch 142, a sufficient force must be applied in order to rotate the drum 622 in the second direction and reel the strap 624 back in around the drum 622. In the present aspect, as the wrench 723 is cranked to actuate rotation of the drum 622 and reel the strap 624 in around the drum 622, the rear lift frame 144 can pivot about the upper hitch pin 615a towards the rear end 114 of the towed vehicle 110. As such, the rear axle 150 to which the winch 620 is mounted can be drawn towards the rear end 114 of the towed vehicle 110, and the rear tow wheels 146 can roll on the ground surface 190 towards the rear end 114. As the rear axle 150 and rear tow wheels 146 move towards the rear end 114 of the vehicle, the rear lift frame 144 can move to a more upright orientation, as shown in FIGS. 8 and 9, and thus the frame legs 660 can be raised relative to the ground surface 190. The mounting hitch 142 attached to the frame legs 660 by the upper hitch pin 615a can be raised along with the frame legs 660. As described above, the mounting hitch 142 can be secured to the rear end 114 of the towed vehicle 110, and thus, the rear end 114 of the towed vehicle 110 can be raised along with the mounting hitch 142 and the rear vehicle wheels 118 can be elevated above the ground surface 190, as shown and described in further detail with respect to FIG. 8.

The lower shock brackets 670 (shown in FIG. 6) can be attached to the coupling brackets 700 on the rear axle 150, and corresponding upper shock mounts 770 can be attached to the towed vehicle 110 at the rear end 114 thereof. One or more fasteners (not shown) can be provided for securing the upper shock mounts 770 to the towed vehicle 110. The fasteners can include, for example, bolts, screws, rivets, welding, and the like. As shown, each of the shock absorbers 148 can be secured at an upper end 750 thereof to a corresponding one of the upper shock mounts 770 by another fastener, such as a lynch pin 772, as shown, or any other suitable fastener known in the art. Each of the shock absorbers 148 can also be secured at a lower end 850 (shown in FIG. 8) thereof to the lower shock brackets 670, as described in further detail below with respect to FIG. 10. In the present configuration, the shock absorbers 148 have been attached to the upper shock mounts 770 with the lynch pins 772, but have not yet been attached to the lower shock brackets 670. According to the present aspect, each of the shock absorbers 148 can comprise a piston assembly 752 and a spring 754; however, other aspects of the shock absorbers 148 can define any other suitable configuration known in the art. The shock absorbers 148 can be configured to absorb the impact of the bumps as the towed vehicle 110 is towed across the ground surface 190, reducing jarring of the towed vehicle 110.

FIGS. 8 and 9 illustrate the rear lifting mechanism 140 in the operable configuration, wherein the rear vehicle wheels 118 of the towed vehicle 110 can be elevated above the ground surface 190. The lower end 850 of each of the shock absorbers 148 can be secured to the corresponding lower shock bracket 670 (shown in FIG. 10) by a fastener, such as, for example, shock hitch pins 950 (shown in FIG. 9). Furthermore, as shown, the rear lift frame 144 can be drawn towards the rear end 114 of the towed vehicle 110 by the winch 620 until the rear lift frame 144 is oriented substantially upright relative to the ground surface 190. In the upright orientation, the frame legs 660 of the rear lift frame 144 can be oriented substantially parallel with the hitch column 644 on the opposing sides thereof. With the upper hitch pin 615a already pivotably coupling the rear lift frame 144 to the hitch column 644, the lower hitch pin 615b can be inserted through the upper holes 744a (shown in FIG. 7) formed in the frame legs 660 and a corresponding one of the holes 1044 (shown in FIG. 10) in the hitch column 644, to prohibit pivotable movement of the rear lift frame 144 relative to the hitch column 644 and to secure the rear lift frame 144 in the upright orientation. With movement of the rear lift frame 144 prohibited relative to the mounting hitch 142, the rear vehicle wheels 118 can remain elevated above the ground surface 190, and the rear tow wheels 146 can roll on the ground surface 190 as the towed vehicle 110 is towed.

FIG. 10 illustrates a partially exploded view of the rear lifting mechanism 140. As shown, the mounting hitch 142 can generally define an L-shape and can comprise the hitch column 644 and the hitch connector 745 oriented substantially perpendicular to the hitch column 644. In some aspects, a reinforcement member 1046 can extend between the hitch column 644 and the hitch connector 745. A plurality of the holes 1044 can be formed through the hitch column 644, which can be selectively engaged by the upper and lower hitch pins 615a,b to attach the rear lift frame 144 to the mounting hitch 142. In some aspects, the hitch column 644 may define only an upper one of the holes 1044 and a lower one of the holes 1044, which can correspond to the upper and lower hitch pins 615a,b, respectively. However, in other aspects, the hitch column 644 can define additional holes 1044, as shown. Moreover, the eyebolt 746 can be secured to the hitch connector 745 of the mounting hitch 142, and can define the eyebolt opening 748 therethrough, which can be configured to releasably receive the hook 725 of the winch 620 therethrough.

Referring to the rear lift frame 144, the frame legs 660 can be oriented substantially parallel with one another and can define a space 1062 therebetween that can be configured to receive the hitch column 644. The frame legs 660 can define the upper and lower holes 744a,b (shown in FIG. 7) through which the upper and lower hitch pins 615a,b can extend, respectively. Each of the frame arms 662 can extend from the proximal end 661 of the corresponding frame leg 660, and the bent distal end 762 (shown in FIG. 7) of each frame arm 662 can be secured to the rear axle 150. As shown, each of the frame arms 662 can be oriented at an obtuse angle relative to the corresponding frame leg 660 in the present aspect. The coupling brackets 700 can be provided for coupling the corresponding distal ends 762 of the frame arms 662 to the rear axle 150, and the each of the lower shock brackets 670 can be attached to a corresponding one of the coupling brackets 700. A one of the shock hitch pins 950 can engage each of the lower shock brackets 670. In example aspects, each of the shock hitch pins 950 can be configured to extend through a first hole (not shown) formed in a first side of the corresponding lower shock bracket 670, through a lower shock opening (not shown) formed through the lower end 850 of the corresponding shock absorber 148, and through a second hole (not shown) formed in a second side of the corresponding lower shock bracket 670 to secure the shock absorber 148 to the lower shock bracket 670.

Each of the shock absorbers 148 can also define an upper shock opening (not shown) formed through the upper end 750 thereof, and a corresponding one of the lynch pins 772 can extend through the upper shock opening to secure the shock absorber 148 to the corresponding upper shock mount 770. The upper shock mounts 770 and lynch pins 772 are shown and described in further detail below with respect to FIG. 12. As shown, each of the shock absorbers 148 can comprise the piston assembly 752 and the spring 754. Each corresponding piston assembly 752 and the spring 754 can generally extend between the upper and lower ends 750,850 of the shock absorber 148. In some aspects, each of the shock absorbers 148 can define an upper end housing 1050 formed at the upper end 750 thereof and a lower end housing 1052 at the lower end 850 thereof. The upper and lower shock openings can be defined through the upper and lower end housings 1050,1052, respectively.

Figure 11:
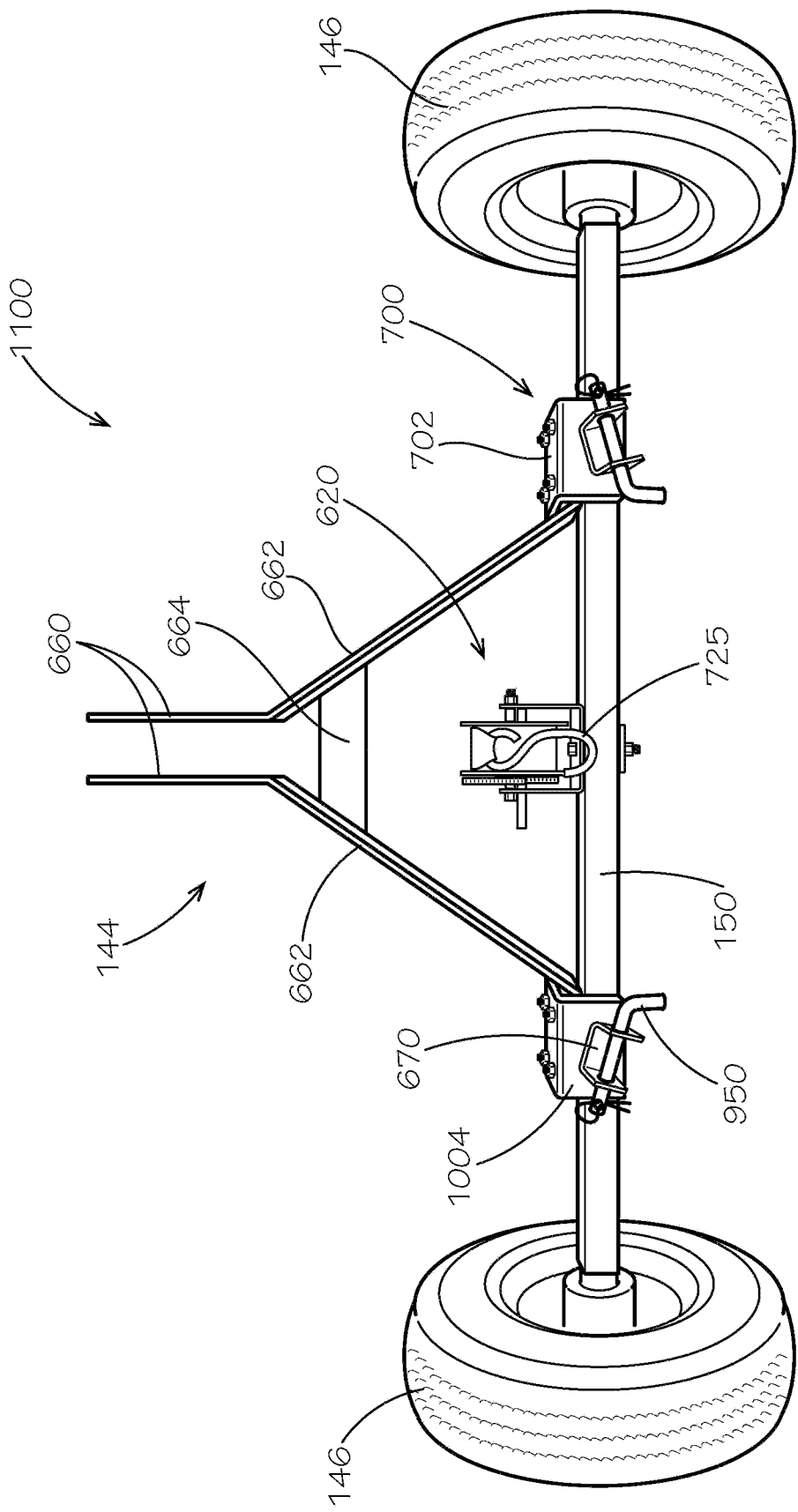
FIG. 11 is a front view of a rear assembly of the rear lifting mechanism of FIG. 1.

The rear axle 150 can be secured to the frame arms 662 of the rear lift frame 144 by the coupling brackets 700 and the corresponding U-bolt assemblies 705 (shown in FIG. 7). In the present aspect, the rear axle 150 can be oriented about perpendicular to the frame legs 660 of the rear lift frame 144. As shown, a first one of the rear tow wheels 146 can be mounted to the rear axle 150 at the first axle end 652, and a second one of the rear tow wheels 146 can be mounted to the rear axle 150 at the second axle end 654 opposite the first rear tow wheel 146. Each of the rear tow wheels 146 can be rotatably mounted to the rear axle 150, such that the rear tow wheels 146 can roll along the ground surface 190 (shown in FIG. 1) as the towed vehicle 110 (shown in FIG. 1) is being towed. Example aspects of the rear tow wheels 146 may be sufficiently sized for towing towed vehicles 110 of varying weights. According to example aspects, the winch 620 can be mounted to the rear axle 150 about centrally between the opposing rear tow wheels 146. The winch 620 can comprise the strap 624 spooled around the drum 622, and the drum 622 can rotate relative to the rear axle 150 to allow the strap 624 to be reeled out from the drum 622 or reeled in around the drum 622. The hook 725 can be attached to the outer end 724 of the strap 624, and can define a hook end 1026 configured to engage the eyebolt opening 748 of the eyebolt 746 that is coupled to the mounting hitch 142. FIG. 11 illustrates a detailed view of a rear assembly 1100 comprising the rear lift frame 144, rear axle 150, the rear tow wheels 146, and the winch 620.

Figure 12:
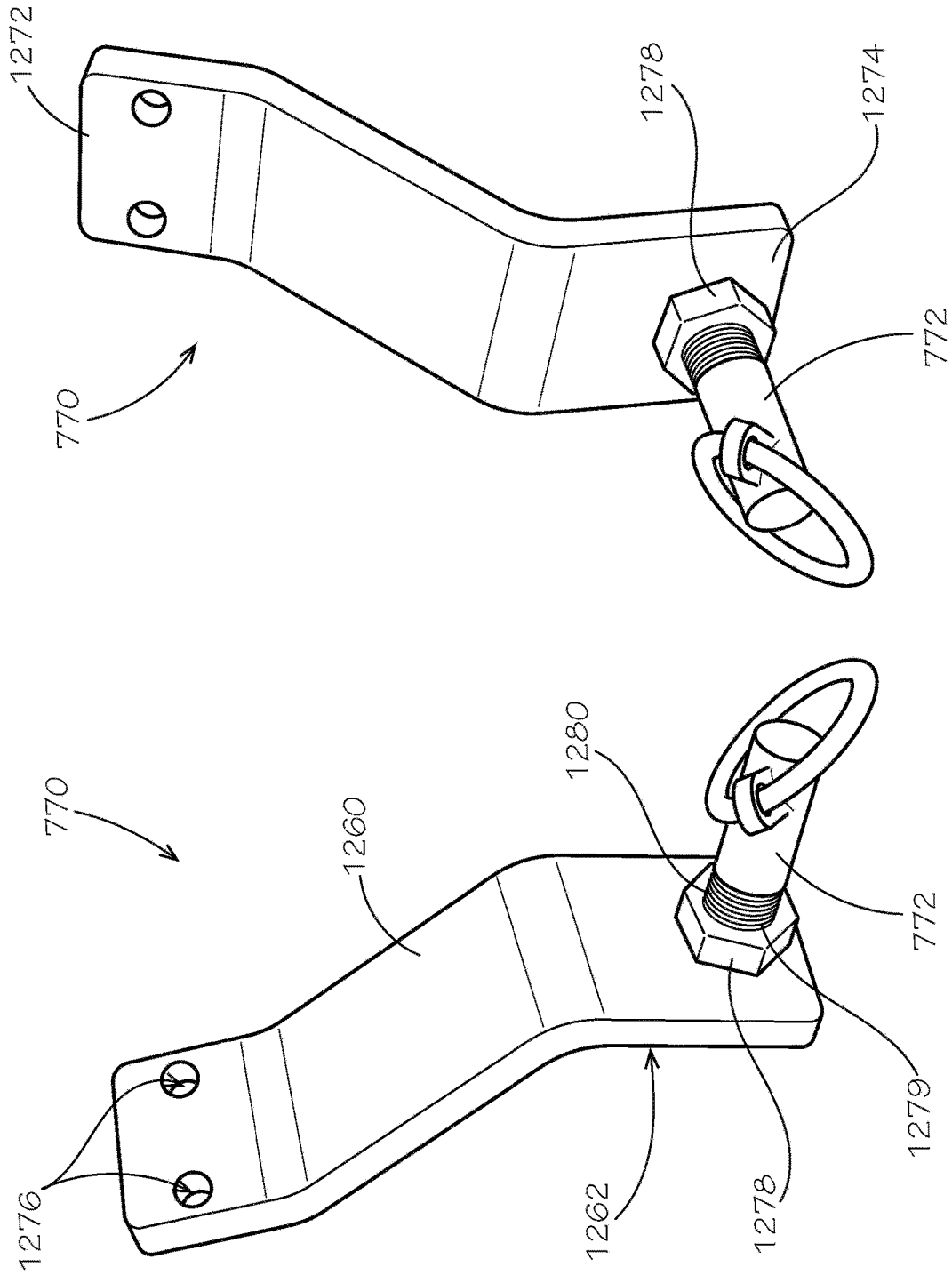
FIG. 12 is a perspective view of a pair of shock mounts of the rear lifting mechanism of FIG. 1.

FIG. 12 illustrates the upper shock mounts 770 according to an example aspect of the present disclosure. As shown, each of the upper shock mounts 770 can generally define a first end 1272 and a second end 1274. One or more fastener holes 1276 can be formed through the upper shock mounts 770, and in the present aspect, the fastener holes 1276 can be formed proximate to the corresponding first ends 1272. A fastener (not shown) can be configured to extend through each of the fastener holes 1276 and to engage the rear end 114 (shown in FIG. 1) of the towed vehicle 110 (shown in FIG. 1) to couple the corresponding upper shock mounts 770 to the towed vehicle 110. The fasteners can be, for example, bolts, screws, rivets, or any other suitable fastener known in the art. In other aspects, the upper shock mounts 770 can be welded to the towed vehicle 110, or can be attached thereto by any other suitable attachment methods known in the art. Each of the upper shock mounts 770 can further define a pin hole (not shown) formed therethrough, and in the present aspect, each of the pin holes can be formed proximate to the second end 1274 of the corresponding upper shock mount 770. In other aspects, the fastener holes 1276 and/or pin holes can be oriented at any other suitable location on the upper shock mounts 770. Each of the lynch pins 772 can be configured to extend through the upper shock opening of the corresponding shock absorber 148 (shown in FIG. 10) and through the pin hole of the corresponding upper shock mount 770 to couple the shock absorber 148 to the upper shock mount 770. Moreover, in some aspects, as shown, one or more first nuts 1278 can be mounted on each of the lynch pins 772. For example, in some aspects, each lynch pin 772 may define external threading 1280 configured to mate with a threaded bore 1279 of a corresponding one of the first nuts 1278. In the present aspect, each of the first nuts 1278 can abut a front surface 1260 of the corresponding upper shock mount 770, as shown. A second nut (not shown) may be mounted on each of the lynch pins 772 and can abut a rear surface 1262 of the corresponding upper shock mount 770, such that the upper shock mount 770 can be sandwiched between the corresponding first nut 1278 and second nut, thereby securing the lynch pin 772 to the upper shock mount 770.

FIG. 13 illustrates the towed vehicle assembly 105 comprising the towing system 100 mounted to the towed vehicle 110. The towing system 100 can comprise the front lifting mechanism 130 and the rear lifting mechanism 140, each of which is shown in the operable configuration in the present aspect. The front lifting mechanism 130 can be secured to the towed vehicle 110 at the front end 112 thereof, and the rear lifting mechanism 140 can be secured to the towed vehicle 110 at the rear end 114 thereof. According to example aspects, the front lifting mechanism 130 can be also be attached to the driven vehicle 1300 via the trailer hitch 215, which can be driven by a user to tow the towed vehicle 110 on the towing system 100. The driven vehicle 1300 can be any suitable type of vehicle capable of pulling the weight of the towed vehicle assembly 105 and connecting to the trailer hitch 215 on the trailer tongue 136. For example and without limitation, the driven vehicle 1300 can be a tow truck, a box truck, a flatbed truck, a van, a pickup truck, a utility vehicle, an SUV, a car, a motorcycle, an ATV, or the like.

As shown, in the operable configuration of the front lifting mechanism 130, the front lifting mechanism 130 can be configured to elevate the front end 112 of the towed vehicle 110, including the front vehicle wheels 116, above the ground surface 190. Similarly, in the operable configuration of the rear lifting mechanism 140, the rear lifting mechanism 140 can be configured to elevate the rear end 114 of the towed vehicle 110, including the rear vehicle wheels 118, above the ground surface 190. As such, with both the front and rear lifting mechanisms 130,140 in the operable configurations, the entire towed vehicle 110 can be supported by the towing system 100 above the ground surface 190. This can eliminate any wear and tear on the towed vehicle 110 that can occur when a towed vehicle 110 is not fully supported above the ground surface 190 (i.e., when some or all of the vehicle wheels 115 are engaged with the ground surface 190 during towing.) Thus, with both of the front and rear lifting mechanisms 130,140 in the operable configuration, the towed vehicle assembly 105 can be in a towable mode, as shown, wherein the towed vehicle 110 is capable of being towed by the driven vehicle 1300.

In some other aspects, it may be desired to elevate only the front vehicle wheels 116 above the ground surface 190. In such an instance, only the front lifting mechanism 130 may be required for towing the towed vehicle 110. In still other aspects, it may be desired to elevate only rear vehicle wheels 118 above the ground surface 190. In such an instance, the rear lifting mechanism 140 can be required for elevating the rear wheels, and the front lifting mechanism 130 may also be required for coupling the towed vehicle 110 to the driven vehicle 1300. However, it may not be necessary to orient the front lifting mechanism 130 in the operable configuration. That is to say, the lift connector 134 could remain in the raised position, and the front vehicle wheels 116 could remain engaged with the ground surface 190. Alternatively, a coupling device other than the front lifting mechanism 130 could be provided for coupling the towed vehicle 110 to the driven vehicle 1300. In still other aspects, any other suitable towing mechanism known in the art can be used interchangably with either of the front and rear lifting mechanisms 130,140. That is to say, the front lifting mechanism 130 of the present disclosure could be used with any other suitable rear lifting mechanism known in the art, and similarly, the rear lifting mechanism 140 of the present disclosure could be used with any other suitable front lifting mechanism known in the art.

According to example aspects, a method of towing the towed vehicle 110 can comprise providing the towed vehicle 110 to be towed, wherein the towed vehicle 110 can comprise the front end 112, the rear end 114, and at least one of the vehicle wheels 115. The method can comprise securing the front lifting mechanism 130 to the front end 112 of the towed vehicle 110 and to the driven vehicle 1300, and securing the rear lifting mechanism 140 to the rear end 114 of the towed vehicle 110, wherein the rear lifting mechanism 140 can comprise at least one of the rear tow wheels 146. The method can further comprise configuring each of the front lifting mechanism 130 and rear lifting mechanism 140 in an operable configuration to elevate the at least one vehicle wheel 115 of the towed vehicle 110 above the ground surface 190. The method can further comprise driving the driven vehicle 1300 to tow the towed vehicle 110 across the ground surface 190, wherein the rear tow wheel 146 can roll along the ground surface 190 as the towed vehicle 110 is towed.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

The invention claimed is:

1. A towing system comprising:
a first lifting mechanism comprising a winch, the winch comprising a drum, a strap, and a drive mechanism, the winch configured to connect a first end of a towable object to a driven vehicle, the first lifting mechanism configurable in a first operable configuration, and wherein the drive mechanism rotates the drum and the strap is increasingly spooled around the drum to elevate the first end of the towable object in the first operable configuration; and a second lifting mechanism rotatable about a pivot into a second operable configuration, the second lifting mechanism configured to connect to a second end of the towable object and wherein the drive mechanism rotates the second lifting mechanism about the pivot to elevate the second end relative to a ground surface in the second operable configuration.

2. The towing system of claim 1, wherein the second lifting mechanism comprises a lift frame, an axle coupled to the lift frame, and a tow wheel rotatably coupled to the axle, and wherein the tow wheel is configured to engage and roll along the ground surface in the second operable configuration.

3. The towing system of claim 2, wherein the drive mechanism comprises a hand crank.

4. The towing system of claim 2, wherein the drive mechanism comprises a motor.

5. The towing system of claim 2, wherein the winch further comprises a fastener secured to the strap, the fastener configured to couple the first lifting mechanism to the first end of the towable object.

6. The towing system of claim 5, wherein the fastener is a hook configured to engage the first end of the towable object.

7. The towing system of claim 1, wherein the strap of the drive mechanism couples the first lifting mechanism to the second lifting mechanism, and the winch of the drive mechanism comprises a hand crank configured to spool the strap around the drum and elevate the first end of the towable object in the first operable configuration and pivot the second end into the second operable configuration.

8. The towing system of claim 1, wherein the strap of the drive mechanism couples the first lifting mechanism to the second lifting mechanism, and the winch of the drive mechanism comprises an electric motor configured to spool the strap around the drum and elevate the first end of the towable object in the first operable configuration and pivot the second end into the second operable configuration.

9. The towing system of claim 1, wherein the second lifting mechanism comprises a mounting hitch, a lift frame, an axle, and a tow wheel configured to roll along the ground surface, wherein the second lifting mechanism is configured to elevate the second end of the towable object relative to the ground surface in the second operable configuration.

10. The towing system of claim 1, wherein the pivot is an upper hitch pin of the second lifting mechanism, and the strap extends from the first lifting mechanism to the second lifting mechanism.

\* \* \* \* \*